No. 841,893. PATENTED JAN. 22, 1907.
A. PRIEBE.
AUTOMATIC CLOSURE FOR RECEPTACLES.
APPLICATION FILED SEPT. 24, 1906.
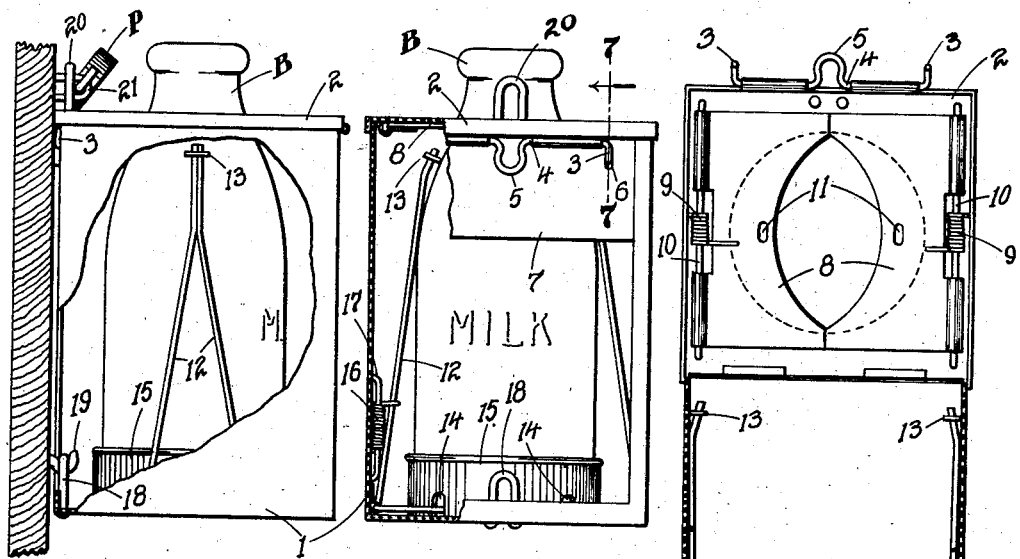
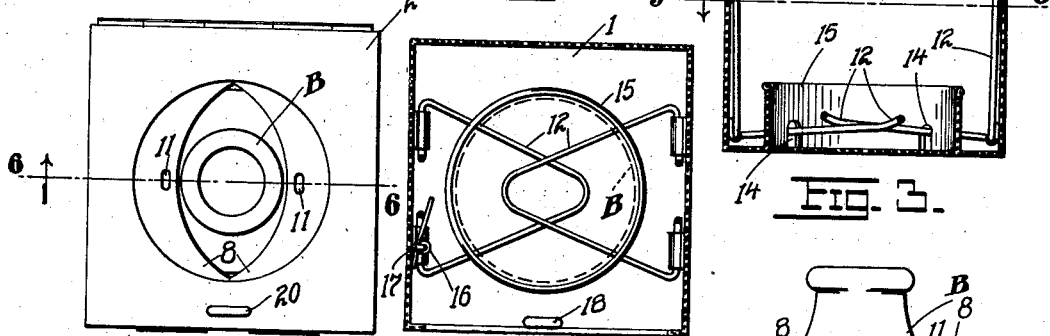
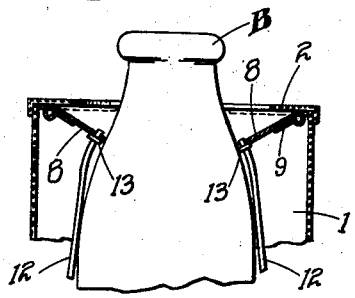
WITNESSES:
INVENTOR.
Amandus Priebe
BY
ATTORNEY.

UNITED STATES PATENT OFFICE.

AMANDUS PRIEBE, OF ST. LOUIS, MISSOURI.

AUTOMATIC CLOSURE FOR RECEPTACLES.

No. 841,893.  Specification of Letters Patent.  Patented Jan. 22, 1907.

Application filed September 24, 1906. Serial No. 336,056.

*To all whom it may concern:*

Be it known that I, AMANDUS PRIEBE, a citizen of the United States, residing at St. Louis, State of Missouri, have invented certain new and useful Improvements in Automatic Closures for Receptacles, of which the following is a full, clear, and exact description, reference being had to the accompanying drawings, forming a part hereof.

My invention has relation to improvements in automatic closures for receptacles; and it consists in the novel construction and arrangement of parts more fully set forth in the specification and pointed out in the claims.

In the drawings, Figure 1 is a side elevation of a receptacle with wall partly broken away, showing my invention applied thereto. Fig. 2 is a rear elevation, parts being broken away. Fig. 3 is a middle vertical transverse section, with lid, however, swung to an open position and bottle removed. Fig. 4 is a top plan of Fig. 1. Fig. 5 is a horizontal section on line 5 5 of Fig. 3. Fig. 6 is a vertical transverse section of the top of the receptacle with the bottle inserted, the section being on line 6 6 of Fig. 4. Fig. 7 is a vertical sectional detail on line 7 7 of Fig. 2, and Fig. 8 is a section on the order of that shown in Fig. 6 with the bottle on the verge of its lowest position and showing the top wings on the verge of slipping off the base of the neck of the bottle to assume their closed position as shown in Fig. 2.

The present invention is specially designed to prevent the theft of bottles of milk delivered to a customer and generally left on the outside of the dwelling or store, the object of the invention being to provide a receptacle into which the bottle may be deposited by the driver, the receptacle being provided with a closing or locking device which will securely lock the bottle within the receptacle without any possibility of abstraction by unauthorized persons. While specially designed for the purpose here designated, it will be apparent that its use is not limited thereto, but may be employed for similar and kindred purposes, all as herein will more fully appear from the detailed description, which is as follows:

Referring to the drawings, 1 represents a box or receptacle inclosed, preferably, on three sides, (front and sides,) the same being provided with a hinged lid or top 2, mounted on the front wall and closing rearwardly, the free edge of the lid being provided with locking catches or hooks 3, forming the terminals of a hinge-pin 4, carried by the lid, the middle of the pin being provided with a looped handle 5. The catches are adapted to engage openings 6 6, formed in the upper transverse member 7, constituting the rear wall of the receptacle. The lid is provided with a large circular opening for the free and ready insertion therethrough of a milk-bottle B, this opening being normally and virtually closed by the wings or shutters 8 8, hinged on the inside of the lid along the sides thereof, the wings being normally forced to a closed position against the adjacent surface of the lid by the springs 9 9, each spring having its body portion coiled about the hinge-pin 10 of the wing and its terminals secured or engaging the wing and body of the lid, respectively. No claim is made to those details, as they are well understood by every mechanic. The adjacent edges of the wings are cut away or concaved a suitable depth, so as to fully embrace the curvature of the base of the neck of the bottle. Adjacent to the centers of the concave edges are openings or slots 11 for a purpose presently to appear.

Hinged along the bases of the side walls of the receptacle on the inside thereof are bell-crank frames or members 12 12, preferably bent to substantially the shape as shown out of a single piece of wire, the vertical legs of said bell-cranks being formed by uniting the ends of the wires and forming adjacent to the ends so united limiting collars or shoulders 13, preferably of a sheet of metal passed over the ends of the wire and soldering them thereto. The respective contiguous legs of the bell-crank frames or members referred to are bent in planes making an acute angle with one another, so that when the vertical members rest against the sides of the receptacle the horizontal or basal members will incline to the bottom of the receptacle, the said basal legs, moreover, crossing or overlapping each other, as shown. The wire sides of the respective bottom legs pass through cut-away portions 14 of an annular rim or ring 15, soldered to the bottom, within which rim the bottle B is received. The bell-crank members 12 are normally forced to an open position—that is, with the vertical legs against the sides of the receptacle—by a spring 16, coiled about a rod 17, soldered to the side wall to one side of the member, one end of the spring bearing against the wall of the receptacle and the other bearing against the adjacent leg of the bell-crank. This manner of retaining the member 12 in an open position, however, is a familiar construction in all spring-hinges, and I lay no special claim thereto, except that by crossing the basal legs of the frames a single spring serves to actuate both frames, one frame responding to the movement of the other. The bottom of the rear of the box is provided with a staple 18, through which may be passed a hook 19, carried by the wall on which the box is suspended, the top of the rear edge of the lid also having a staple 20 for the passage of a staple 21, to which a padlock P may be secured, and thus lock the box securely in place.

The operation of the device is as follows: Supposing the receptacle to be empty, the milkman forces the bottom of the bottle B against the wings 8, forcing them to an open position and driving the bottle past them until the bottom of the bottle rests against the upwardly-inclined basal legs of the bell-crank members or frames 12, Fig. 8. The weight of the full bottle depresses the basal legs of the bell-cranks against the bottom wall of the receptacle, whereupon the side or vertical members rock toward the bottle, which is all the time descending. By this time the wings have passed the base of the neck of the bottle, and the latter offering no resistance to the upward oscillation of the wings said wings return to their normally closed positions against the lid, and now only the top of the neck of the bottle projects beyond or out of the receptacle, Fig. 2. The vertical legs of the bell-crank frames have now snugly inclosed the sides of the bottle, which cannot be abstracted through the opening formed by the cut-away portions of the wings, because this opening while sufficient for the neck is too small for the body of the bottle, and should an unauthorized person attempt to force the wings inward they would be limited by the ends of the vertical legs of the bell-cranks passing into the slots 11, when the collars or shoulders 13 on said legs would limit any further inward oscillation of the wings, Fig. 6. So it will be observed that when the vertical legs of the bell-cranks have encompassed or engaged the sides of the bottle the ends thereof are in position to pass into the slots 11 of the wings and arrest any further inward movement thereof by the collars 13, carried by said bell-cranks, Fig. 8, so that the bottle cannot be abstracted until the owner unlocks the padlock, removes the receptacle from its position, and opens the lid, when the bottle may be removed, Fig. 3. The removal of the bottle allows the bell-cranks to fly open ready to receive a fresh bottle at the next delivery, Fig. 2.

Having described my invention, what I claim is—

1. An automatic closure for receptacles comprising a pair of bell-crank members composed of basal and vertical legs pivoted a suitable distance apart to receive the article to be inserted between them, means for automatically opening said members to receive the article, the latter engaging the basal legs of the members for its lowest position and oscillating the vertical legs against the sides of the article, and means automatically engaging the article at a point above the bell-crank members and preventing its withdrawal, substantially as set forth.

2. An automatic closure for receptacles comprising a pair of bell-crank members pivoted a suitable distance apart to receive an article between them, the respective legs of each member being disposed at an acute angle whereby upon forcing the end of the article against the corresponding legs of the members, the opposite legs will be forced into engagement with the sides of the article, means for automatically engaging the article at a point beyond the bell-crank members for the closed or engaging position of the said members, and springs for automatically forcing the engaging legs of the members apart, upon withdrawal of the article, substantially as set forth.

3. In combination with a receptacle having a lid at one end provided with an opening, spring-controlled wings hinged to the inside of the lid and opening inwardly and having concave inner edges for the free passage of a bottle, a pair of bell-crank frames having basal and vertical legs hinged on opposite sides of the bottom of the receptacle, the legs of the frames being disposed opposite the bottom, and side walls of the receptacle respectively, springs for forcing or oscillating the vertical legs against the side walls, the basal legs being disposed at an acute angle to the planes of the contiguous legs of the frames, collars formed at points contiguous to the free ends of the vertical legs, the ends of the vertical legs beyond the collars engaging suitable openings formed in the wings in case of an unauthorized attempt to abstract the bottle, the parts operating substantially as, and for the purpose set forth.

4. In an automatic closure for receptacles, a pair of hinged bell-crank frames spaced a suitable distance apart for the reception of an article between them and adapted to have their opposite legs oscillated toward the article by a pressure of said article against the adjacent legs of the frames, substantially as set forth.

5. In an automatic closure for receptacles, a pair of bell-crank frames hinged a suitable distance apart with contiguous legs crossing each other at an intermediate point of their length, a spring for forcing the opposite legs sufficiently apart to permit the introduction of an article between them, the pressure of the article against the contiguous legs forcing the opposite legs into engagement with the sides of the article whereby the latter is embraced, and means for locking said opposite legs in their engaging position, substantially as set forth.

6. In an automatic closure for bottle-receptacles, a lid having an opening for the free passage therethrough of an article into the receptacle, spring-controlled inwardly-opening wings hinged on the inside of the lid, and having cut-away portions to admit the bottle and pass snugly around the neck thereof, and means located in the receptacle for arresting the wings in an undue inward oscillation, in the event of attempted abstraction of the bottle by unauthorized persons, substantially as set forth.

In testimony whereof I affix my signature in presence of two witnesses.

AMANDUS PRIEBE.

Witnesses:
 EMIL STAREK,
 JOS. A. MICHEL.